US00RE46235E

(19) United States
(12) Reissued Patent
Bigorra Llosas et al.

(10) Patent Number: US RE46,235 E
(45) Date of Reissued Patent: Dec. 13, 2016

(54) PROCESS FOR THE SEPARATION OF NON-SULFIDIC MINERALS AND ORES FROM UNWANTED CONSTITUENTS OF CRUDE MINERAL AND ORE

(71) Applicant: Cognis IP Management GmbH, Düsseldorf (DE)

(72) Inventors: Joaquin Bigorra Llosas, Sabadell (ES); Dietger Koppl, Monchengladbach (DE); Simone Hoffmann-Doerr, Duesseldorf (DE); Klaus Hinrichs, Monheim (DE)

(73) Assignee: Cognis IP Management CMBH, Duesseldorf (DE)

(21) Appl. No.: 14/790,635

(22) Filed: Jul. 2, 2015

Related U.S. Patent Documents

Reissue of:
(64) Patent No.: 8,474,627
Issued: Jul. 2, 2013
Appl. No.: 12/524,710
PCT Filed: Jan. 17, 2008
PCT No.: PCT/EP2008/000309
§ 371 (c)(1),
(2) Date: Jul. 27, 2009
PCT Pub. No.: WO2008/089906
PCT Pub. Date: Jul. 31, 2008

(30) Foreign Application Priority Data

Jan. 26, 2007 (EM) ..... 07001677

(51) Int. Cl.
*B03D 1/01* (2006.01)
*B03D 1/02* (2006.01)
*B03D 1/016* (2006.01)

(52) U.S. Cl.
CPC ..... *B03D 1/01* (2013.01); *B03D 1/016* (2013.01); *B03D 1/02* (2013.01)

(58) Field of Classification Search
CPC ..... B03D 1/01; B03D 1/02; B03D 1/016
See application file for complete search history.

(56) References Cited

U.S. PATENT DOCUMENTS

| | | | | |
|---|---|---|---|---|
| 2,173,909 | A | 9/1939 | Kritchevsky | |
| 2,389,763 | A | 11/1945 | Cahn | |
| 2,494,132 | A * | 1/1950 | Jayne et al. | 209/166 |
| 5,349,106 | A | 9/1994 | Behler et al. | |
| 5,670,677 | A | 9/1997 | Ponsati Obiols et al. | |
| 5,880,299 | A * | 3/1999 | Ponsati Obiols et al. | 554/109 |
| 2005/0047983 | A1* | 3/2005 | Cameron et al. | 423/324 |
| 2008/0214776 | A1 | 9/2008 | Bigorra Llosas et al. | |
| 2010/0078364 | A1* | 4/2010 | Bigorra Llosas | B03D 1/01 209/167 |

FOREIGN PATENT DOCUMENTS

| | | | |
|---|---|---|---|
| AU | 708335 | | 8/1997 |
| CA | 2083818 | | 11/1991 |
| CA | 2083818 | A1 | 11/1991 |
| DE | 64275 | | 11/1967 |
| DE | 2547987 | A | 4/1977 |
| DE | 4016792 | | 11/1991 |
| DE | 4016792 | A1 | 11/1991 |
| DE | 40 26 184 | A1 | 2/1992 |
| DE | 4026184 | | 2/1992 |
| DE | 43 08 792 | C1 | 4/1994 |
| DE | 4308792 | | 4/1994 |
| DE | 44 09 322 | C1 | 4/1995 |
| DE | 4409322 | | 4/1995 |
| DE | 2547987 | | 4/1997 |
| EP | 1025908 | | 8/2000 |
| IL | 50767 | | 5/1980 |
| WO | 97/26995 | A1 | 7/1997 |
| WO | WO-97/26995 | | 7/1997 |

* cited by examiner

*Primary Examiner* — Jerry D Johnson
(74) *Attorney, Agent, or Firm* — Lowenstein Sandler LLP

(57) ABSTRACT

A process for the flotation of non-sulfidic minerals or ores, is disclosed in which crushed crude minerals or ores are mixed with water and a collector to form a suspension, air is introduced into the suspension in the presence of a reagent system, and a floated foam containing the non-sulfidic mineral or ores is formed therein along with a flotation residue comprising the gangue polymeric esterquats as the collector polymeric esterquats. The polymeric esterquats are obtained by reacting alkanolamines with a mixture of mono-carboxylic acids and dicarboxylic acids and quaternizing the resulting esters, optionally after alkoxylation.

18 Claims, No Drawings

PROCESS FOR THE SEPARATION OF NON-SULFIDIC MINERALS AND ORES FROM UNWANTED CONSTITUENTS OF CRUDE MINERAL AND ORE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is the National Stage entry of PCT/EP2008/000309, filed Jan. 17, 2008, which claims priority to European Patent application number 07001677, filed Jan. 26, 2007, both of which are incorporated herein by reference in their entireties.

FIELD OF THE INVENTION

This invention relates to the flotation of non-sulfidic minerals and ores and more particularly the use of certain cationic surfactants as collectors in a froth flotation process.

BACKGROUND OF THE INVENTION

Flotation is a separation technique commonly used in the dressing of minerals and crude ores for separating valuable materials from the gangue. Non-sulfidic minerals and ores in the context of the present invention include, for example, calcite, apatite, fluorite, scheelite, baryta, iron oxides and other metal oxides, for example, the oxides of titanium and zirconium, and also certain silicates and aluminosilicates. In dressing processes based on flotation, the mineral or ore is normally first subjected to preliminary size-reduction, dry-ground, but preferably wet-ground and suspended in water. Collectors are then normally added, often in conjunction with frothers and, optionally, other auxiliary reagents such as regulators, depressors (deactivators) and/or activators, in order to facilitate separation of the valuable materials from the unwanted gangue constituents of the ore in the subsequent flotation process. These reagents are normally allowed to act on the finely ground ore for a certain time (conditioning) before air is blown into the suspension (flotation) to produce a froth at its surface. The collector hydrophobicizes the surface of the minerals so that they adhere to the gas bubbles formed during the activation step. The valuable constituents are selectively hydrophobicized so that the unwanted constituents of the mineral or ore do not adhere to the gas bubbles. The valuable material-containing froth is stripped off and further processed. The object of flotation is to recover the valuable material of the minerals or ores in as high a yield as possible while at the same time obtaining a high enrichment level of the valuable mineral.

Surfactants and, in particular, anionic, cationic and ampholytic surfactants are used as collectors in the flotation-based dressing of minerals and ores, in particular of calcite which is of considerable value especially for the paper industry. Calcite represents an important filler with the ability for adjusting the whiteness and transparency of the paper. Calcite minerals, however, are often accompanied by silicates so that, to purify the calcite, the silicate—which is undesirable for many applications—has to be removed.

Another problem which has a serious impact on the selectivity of the froth flotation process is related to the magnesium content of the minerals or ores. Magnesium salts seriously improve the stability of the froth, which collapses slowly and therefore increases the flotation time, while the selectivity drops. In order to overcome the disadvantages known from the state of the art, for example, International patent application WO 97/026995 (Henkel) suggests the use of readily biodegradable mixtures of quaternised mono- and diesters of fatty acids and triethanolamine (so-called mono/diesterquats). Although said esterquat mixtures show a superior biodegradability when compared with other cationic collectors, the products still do not lead to satisfactory recovery of the valuable material, in particular calcite minerals, when used in economically reasonable quantities.

Accordingly, an object of the present invention is to provide improved collectors which make flotation processes more economical, i.e. with which it is possible to obtain either greater yields of valuable material for the same quantities of collector and for the same selectivity or at least the same yields of valuable materials for reduced quantities of collector. A second object is to supply collectors which simultaneously meet the needs for high biodegradability.

PREFERRED EMBODIMENTS

The present invention refers to a process for the flotation of non-sulfidic minerals or ores, in which crushed crude minerals or ores are mixed with water and a collector to form a suspension, air is introduced into the suspension in the presence of a reagent system and a floated foam containing said non-sulfidic minerals or ores formed therein along with a flotation residue comprising the gangue, wherein the improvement comprises using as the collector polymeric esterquats, obtainable by reacting alkanolamines with a mixture of monocarboxylic acids and dicarboxylic acids and quaternising the resulting esters in known manner, optionally after alkoxylation Surprisingly it has been observed that said polymeric esterquats are extremely effective as collectors for the flotation of non-sulfidic minerals and ores. In particular with respect to the presence of silicates and/or magnesium salts in the minerals or ores, the collectors according to the present invention have been found even more effective compared to the conventional mono/diesterquat mixture while exhibiting a similarly high degree of biodegradability. In particular, the products have been found rather useful for the separation of silicate minerals from calcite by froth flotation.

The Collectors

The polymeric esterquats to be used as collectors according to the present invention represent known cationic surfactants which have so far been used as softeners for textiles and rinse conditioners for treating hair. The products are disclosed in detail, for example, in EP 0770594 B1 (Henkel); the teaching of this reference is therefore incorporated by reference. More particularly, the polymeric esterquats are obtained by reacting alkanol amines with a mixture of fatty acids and dicarboxylic acids and quaternising the resulting esters in known manner, optionally after alkoxylation.

According to the present invention, suitable polymeric esterquats are derived from alkanolamines are derived from amines following general formula (I).

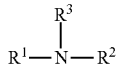

(I)

in which $R^1$ represents a hydroxyethyl radical, and $R^2$ and $R^3$ independently from each other stand for hydrogen, methyl or a hydroxyethyl radical. Typical examples are methyldiethanolamin (MDA), monoethanolamine (MES), diethanolamine (DEA) and triethanolamine (TEA). In a preferred embodiment of the present invention, triethanolamine is used as the starting material.

Fatty acids in the context of the invention are understood to be aliphatic carboxylic acids corresponding to formula (II):

$$R^4COOH \quad (II)$$

in which $R^4CO$ is an aliphatic, linear or branched acyl radical containing 6 to 22 carbon atoms and 0 and/or 1, 2 or 3 double bonds. Typical examples are caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and the technical mixtures thereof obtained, for example, in the pressure hydrolysis of natural fats and oils, in the reduction of aldehydes from Roelen's oxosynthesis or in the dimerization of unsaturated fatty acids. Technical fatty acids containing 12 to 18 carbon atoms, for example, coconut oil, palm oil, palm kernel oil or tallow fatty acids, preferably in hydrogenated or partially hydrogenated form, are preferred.

Dicarboxylic acids suitable for use as starting materials in accordance with the invention correspond to formula (III):

$$HOOC—[X]—COOH \quad (III)$$

in which [X] stands for an optionally hydroxysubstituted saturated or unsaturated alk(en)ylene group containing 1 to 10 carbon atoms. Typical examples are succinic acid, maleic acid, glutaric acid, 1,12-dodecanedioic acid and, in particular, adipic acid.

The fatty acids and the dicarboxylic acids may be used in a molar ratio of 1:10 to 10:1. However, it has proved to be of advantage to adjust a molar ratio of 1:4 to 1:6. The trialkanolamines on the one hand and the acids—i.e. fatty acids and dicarboxylic acids together—on the other hand may be used in a molar ratio of 1:1.3 to 1:2.4. A molar ratio of trialkanolamine to acids of 1:1.4 to 1:1.8 has proved to be optimal. The esterification may be carried out in known manner, for example as described in International patent application WO 91/01295 (Henkel). In one advantageous embodiment, it is carried out at temperatures between 120° C. and 220° C., and more particularly from 130° C. to 170° C. under pressures of 0.01 to 1 bar. Suitable catalysts are hypophosphorous acids and alkali metal salts thereof, preferably sodium hypophosphite, which may be used in quantities of 0.01 to 0.1% by weight, and preferably in quantities of 0.05 to 0.07% b.w. based on the starting materials. In the interests of particularly high colour quality and stability, it has proved to be of advantage to use alkali metal and/or alkaline earth metal borohydrides, for example potassium, magnesium and, in particular, sodium borohydride, as co-catalysts. The co-catalysts are normally used in quantities of 50 to 1000 ppm, and more particularly in quantities of 100 to 500 ppm, again based on the starting materials. Corresponding processes are also the subject of DE 4308792 C1 and DE 4409322 C1 (Henkel) which are incorporated herein by reference in their entireties. Mixtures of the fatty acids and dicarboxylic acids may be used or, alternatively, the esterification may be carried out with the two components in successive steps.

Polymeric esterquats containing polyalkylene oxide may be produced by two methods. First, ethoxylated trialkanolamines may be used. This has the advantage that the distribution of alkylene oxide in the resulting esterquat is substantially the same in regard to the three OH groups of the amine. However, it also has the disadvantage that the esterification reaction is more difficult to carry out on steric grounds. Accordingly, the preferred method is to alkoxylate the ester before quaternisation. This may be done in known manner, i.e. in the presence of basic catalysts and at elevated temperatures. Suitable catalysts are, for example, alkali metal and alkaline earth metal hydroxides and alcoholates, preferably sodium hydroxide, and more preferably, sodium methanolate. The catalysts are normally used in quantities of 0.5 to 5% by weight and preferably in quantities of 1 to 3% by weight, based on the starting materials. Where these catalysts are used, free hydroxyl groups are primarily alkoxylated. However, if calcined hydrotalcites or hydrotalcites hydrophobicized with fatty acids are used as catalysts, the alkylene oxides are also inserted into the ester bonds. This method is preferred where the required alkylene oxide distribution approaches that obtained where alkoxylated trialkanolamines are used. Ethylene and propylene oxide and mixtures thereof (random or block distribution) may be used as alkylene oxides. The reaction is normally carried out at temperatures in the range from 100° C. to 180° C. The incorporation of, on average, 1 to 10 moles of alkylene oxide per mole of ester increases the hydrophilicity of the esterquat, improves solubility and reduces reactivity to anionic surfactants.

The quaternisation of the fatty acid/dicarboxylic acid trialkanolamine esters may be carried out in known manner. Although the reaction with the alkylating agents may also be carried out in the absence of solvents, it is advisable to use at least small quantities of water or lower alcohols, preferably isopropyl alcohol, for the production of concentrates which have a solids content of at least 80% by weight, and more particularly, at least 90% by weight. Suitable alkylating agents are alkyl halides such as, for example, methyl chloride, dialkyl sulfates, such as dimethyl sulfate or diethyl sulphate, for example, or dialkyl carbonates, such as dimethyl carbonate or diethyl carbonate for example. The esters and the alkylating agents are normally used in a molar ratio of 1:0.95 to 1:1.05, i.e. in a substantially stoichiometric ratio. The reaction temperature is usually in the range from 40° C. to 80° C., and more particularly, in the range from 50° C. to 60° C. After the reaction it is advisable to destroy unreacted alkylating agent by addition of, for example, ammonia, an (alkanol) amine, an amino acid or an oligopeptide, as described for example in DE 14026184 A1 (Henkel).

Co-Collectors

In certain cases it may be advantageous to modify, adjust or even support the properties of the quaternised alkanolamine-monoesters by adding defined co-collectors such as, for example, cationic surfactants other than the quaternised alkanolamine-monoesters or amphotheric surfactants.

Where cationic surfactants are to be used as co-collectors in accordance with the invention, they may be selected in particular from

- Primary aliphatic amines,
- Alkylenediamines substituted by alpha-branched alkyl radicals,
- Hydroxyalkyl-substituted alkylenediamines,
- Water-soluble acid addition salts of these amines,
- Quaternary ammonium compounds, and in particular
- Quaternised N,N-dialkylaminoalkylamines.

Suitable primary aliphatic amines include, above all, the $C_8$-$C_{22}$ fatty amines derived from the fatty acids of natural fats and oils, for example n-octylamine, n-decylamine, n-dodecylamine, n-tetradecylamine, n-hexadecylamine, n-octadecylamine, neicosylamine, n-docosylamine, n-hexadecenylamine and n-octadecenylamine. The amines mentioned may be individually used as co-collectors, although amine mixtures of which the alkyl and/or alkenyl radicals derive from the fatty acid component of fats and oils of animal or vegetable origin are normally used. It is known that amine mixtures such as these may be obtained from the fatty acids obtained by lipolysis from natural fats and oils via the associated nitriles by reduction with sodium and alcohols or by catalytic hydrogenation. Examples include tallow amines or hydrotallow amines of the type obtainable from tallow fatty acids or from hydrogenated tallow fatty acids via the corresponding nitriles and hydrogenation thereof.

The alkyl-substituted alkylenediamines suitable for use as co-collectors correspond to formula (IV), $$R^6CHR^7—NH—(CH_2)_nNH_2 \quad (IV)$$

in which $R^6$ and $R^7$ represent linear or branched alkyl or alkenyl radicals and in which n=2 to 4. The production of these compounds and their use in flotation is described in East German Patent DD 64275.

The hydroxyalkyl-substituted alkylenediamines suitable for use as co-collectors correspond to formula (V), $$R^8CH(OH)—CHR^9—NH—(CH_2)_nNH_2 \quad (V)$$

in which $R^8$ and $R^9$ are hydrogen and/or linear alkyl radicals containing 1 to 18 carbon atoms, the sum of the carbon atoms in $R^8$+$R^9$ being from 9 to 18, and n=2 to 4. The production of compounds corresponding to formula (V) and their use in flotation is described in German Patent DE-AS 2547987.

The amine compounds mentioned above may be used as such or in the form of their watersoluble salts. The salts are obtained in given cases by neutralization which may be carried out both with equimolar quantities and also with more than or less than equimolar quantities of acid. Suitable acids are, for example, sulfuric acid, phosphoric acid, acetic acid and formic acid.

The quaternary ammonium compounds suitable for use as co-collectors correspond to formula (VI), $$[R^{10}R^{11}R^{12}R^{13}N^+]X^- \quad (VI)$$

in which $R^{10}$ is preferably a linear alkyl radical containing 1 to 18 carbon atoms, $R^{11}$ is an alkyl radical containing 1 to 18 carbon atoms or a benzyl radical, $R^{12}$ and $R^{13}$ may be the same or different and each represent an alkyl radical containing 1 to 2 carbon atoms, and X is a halide anion, particularly a chloride ion. In preferred quaternary ammonium compounds, $R^{10}$ is an alkyl radical containing 8 to 18 carbon atoms; $R^{11}$, $R^{12}$, and $R^{13}$ are the same and represent either methyl or ethyl groups; and X is a chloride ion.

The most preferred cationic co-collectors, however, encompass the group of quaternised N,N-dialkylaminoalkylamides corresponding preferably to formula (VII), $$[R^{14}CO—NH-[A]-N^+(R^{16})(R^{17})—R^{15}X^- \quad (VII)$$

in which $R^{14}CO$ stands for is an aliphatic, linear or branched acyl radical containing 6 to 22 carbon atoms, preferably 12 to 18 carbon atoms and 0 and/or 1, 2 or 3 double bonds, [A] is a linear or branched alkylene radical having 1 to 4 carbon atoms, preferably 2 or 3 carbon atoms, $R^{15}$, $R^{16}$ and $R^{17}$ may be the same or different, and each represent an alkyl radical containing 1 to 2 carbon atoms, and X is a halide or a alkyl sulfate, particularly a methosulfate ion. A preferred species is Coco fatty acid-N,N-dimethylaminopropylamide. The products are obtainable also according to known manners, for example by transamidation of N,N-dimethylaminopropane with hydrogenated coco glycerides and subsequent quaternisation by means of dimethyl sulfate. It is also preferred to prepare a mixture of collector and co-collector by blending the intermediate polymeric alkanolamine ester and the intermediate N,N-dialkylalkylamide and subject the mixture to a joint quaternisation.

The ampholytic surfactants used as co-collectors in accordance with the invention are compounds which contain at least one anionic and one cationic group in the molecule, the anionic groups preferably consisting of sulfonic acid or carboxyl groups, and the cationic groups consisting of amino groups, preferably secondary or tertiary amino groups. Suitable ampholytic surfactants include, in particular, Sarcosides, Taurides, N-substituted aminopropionic acids and N-(1,2-dicarboxyethyl)-N-alkylsulfosuccinamates.

The sarcosides suitable for use as co-collectors correspond to formula (VIII), $$R^{18}CO—N^+(CH_3)(H)—CH_2COO^- \quad (VIII)$$

in which $R^{18}$ is an alkyl radical containing 7 to 21 carbon atoms, preferably 11 to 17 carbon atoms. These sarcosides are known compounds which may be obtained by known methods. Their use in flotation is described by H. Schubert in "Aufbereitung fester mineralischer Rohstoffe (Dressing of Solid Mineral Raw Materials)", 2nd Edition, Leipzig 1977, pages 310-311 and the literature references cited therein.

The taurides suitable for use as co-collectors correspond to formula (IX), $$R^{19}CO—N^+(CH_3)(H)—CH_2CH_2SO_3^- \quad (IX)$$

in which $R^{19}$ is an alkyl radical containing 7 to 21 carbon atoms, preferably 11 to 17 carbon atoms. These taurides are known compounds which may be obtained by known methods. The use of taurides in flotation is known; cf. H. Schubert, loc. cit.

N-substituted aminopropionic acids suitable for use as co-collectors correspond to formula (X), $$R^{20}(NHCH_2CH_2)_nN^+H_2CH_2CH_2COO^- \quad (X)$$

in which n may be 0 or a number from 1 to 4, while $R^{20}$ is an alkyl or acyl radical containing from 8 to 22 carbon atoms. The afore-mentioned N-substituted aminopropionic acids are also known compounds obtainable by known methods. Their use as collectors in flotation is described by H. Schubert, loc. cit. and in Int. J. Min. Proc. 9 (1982), pp 353-384.

The N-(1,2-dicarboxyethyl)-N-alkylsulfosuccinamates suitable for use as co-collectors according to the invention correspond to formula (XI),

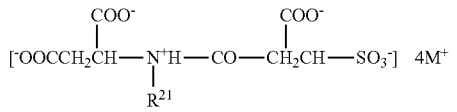

(XI)

in which $R^{21}$ is an alkyl radical containing 8 to 22 carbon atoms, preferably 12 to 18 carbon atoms, and M is a hydrogen ion, an alkali metal cation or an ammonium ion, preferably a sodium ion. The N-(1,2-dicarboxyethyl)-N-alkylsulfosuccinamates mentioned are known compounds which may be obtained by known methods. The use of these compounds as collectors in flotation is also known; cf. H. Schubert, loc. cit.

Said collectors and said co-collectors can be used in a weight ratio of about 10:90 to about 90:10, preferably about 25:75 to about 75:25, and most preferably about 40:60 to about 60:40.

To obtain economically useful results in the flotation of non-sulfidic minerals or ores, the collectors or, respectively, the mixtures of collectors and co-collectors must be used in a certain minimum quantity. However, a maximum quantity of collectors/co-collectors should not be exceeded, because otherwise frothing is too vigorous and selectivity with respect to the valuable minerals decreases. The quantities in which the collectors are be used in accordance with the invention are governed by the type of minerals or ores to be floated and by their valuable mineral content. Accordingly, the particular quantities required may vary within wide limits. In general, the collectors and collector/co-collector mixtures according to the invention are used in quantities of from 50 to 2000 g/mltric ton, and preferably in quantities of from 100 to 1500 g/metric ton of crude ore.

The Flotation Process

Typical steps in the process sequence are, generally, firstly the dry or preferably wet grinding of the minerals or ores, suspension of the resulting ground mineral or ore in water in the presence of the flotation aids, and preferably after a contact time of the collectors and optionally co-collectors present in the flotation aids to be determined in each individual case, injection of air into the plant. In the following the nature of the starting materials as well as the flotation aids is illustrated in more detail.

Non-Sulfidic Minerals and Ores

Floatable minerals and ores may be divided into the two groups of polar and non-polar materials. Since non-polar minerals and ores are difficult to hydrate, these materials have to be classified as hydrophobic. Examples of non-polar minerals are graphite, molybdenite, diamond, coal and talcum which are all floatable in their naturally occurring state. By contrast, polar minerals and ores have strong covalent or ionic surface bonds which are accesible to rapid hydration by water molecules in the form of multi-layers, These starting materials include, for example, calcite, malachite, azurite, chrysocolla, wulfenite, cerrusite, whiterite, megnesite, dolomite, smithsonite, rhodochrosite, siderite, magnetite, monazite, hematite, goethite, chromite, pyrolusite, borax, wolframite, columbite, tantalite, rutile, zircon, hemimorphite, beryl, mica, biotite, quartz, feldspar, kyanite and garnet. The flotation of non-sulfidic, but polar minerals and ores is a preferred object of the present invention.

Particle Size

The flotation behaviour of the individual mineral constituents can be controlled within certain limits through the particle size distribution of the ground mineral. Conversely, however, the use of the collector or collector/co-collector mixture is also influenced by the particle size so that both particle size and, for example, collector concentration may be determined in situ in a brief series of tests. Generally, however, it may be said that the particles have to be increasingly hydrophobicised with increasing particle size before flotation occurs. As a general rule, the ores should be so finely ground that the individual fine particles consist only of one type of mineral, namely either the valuable minerals or the impurities. The ideal particle size normally has to be determined in dependence upon the particular mineral. In the present case, however, a particle size distribution of around 5 to 500 μm has generally been found to be practicable, narrower distributions being of advantage in some cases. For example, silicate-rich ores can be separated by flotation with excellent results using the flotation aids according to the present invention, providing less than 40% b.w., preferably less than 30% b.w., and more preferably less than 15% b.w. of the total mineral or ore fraction has particle sizes of less than 250 μm. To enable the flotation process to be optimally carried out, it can be particularly preferred for the particles larger than 125 μm in size to make up less than 15% b.w., or preferably less than 10% b.w. or even 6% b.w. The lower limit to the particle sizes is determined both by the possibility of size reduction by machine and also by handling properties of the constituents removed by flotation. In general, more than 20% b.w. of the ground mineral or ore should be smaller than about 50 μm in size, a percentage of particles with this diameter of more than 30 or even 40% b.w., for example, being preferred. According to the present invention it is of particular advantage for more than 40% b.w. of the mineral or ore particles to be smaller than 45 μm in diameter.

In certain cases, it may be necessary and appropriate to divide the ground material into two or more fractions, for example three, four or five fractions differing in their particle diameter and separately to subject these fractions to separation by flotation. According to the present invention, the flotation aids may be used in only one separation step although, basically, they may even be used in several separation steps or in all necessary separation steps. The invention also encompasses the successive addition of several different flotation aids, in which case at least one or even more of the flotation aids must correspond to the invention.

The fractions obtainable in this way may be further processes either together or even separately after the flotation process.

Technical Parameters

The technical parameters of the flotation plant in conjunction with a certain flotation aid and a certain mineral or ore can influence the result of the flotation process within certain limits. For example, it can be of advantage to remove the froth formed after only a short flotation time because the content of floated impurities or floated valuable materials can change according to the flotation time. In this case, a relatively long flotation time can lead to a poorer result than a relatively short flotation time. Similarly, it can happen in the opposite case that the separation process leads to a greater purity or otherwise improved quality of the valuable-mineral fraction with increasing time. Optimising external parameters such as these is among the routine activities of the expert familiar with the technical specifications of the particular flotation machine.

Surface Modifiers as Auxiliary Agents

Reagents which modify surface tension or surface chemistry are generally used for flotation. They are normally classified as frothers, controllers, activators and depressants (deactivators), and of course (co-)collectors which already have been discussed above.

Frothers support the formation of froth which guarantee collectors with an inadequate tendency to froth a sufficiently high froth density and a sufficiently long froth life to enable the laden froth to be completely removed. In general, the use of the collectors or collector/co-collector systems mentioned above will eliminate the need to use other frothers. In special cases, however, it may necessary or at least advantageous—depending on the flotation process used—to regulate the frothing behaviour. In this case, suitable frothers are, for example, alcohols, more particularly aliphatic $C_5$-$C_8$ alcohols such as, for example, npentanol, isoamyl alcohol, hexanol, heptanol, methylbutyl carbinol, capryl alcohol, 4-heptanol, which all have good frothing properties. Natural oils may also be used to support frothing. In particular, alcohols, ethers and ketones, for example alpha-terpineol, borneol, fennel alcohol, piperitone, camphor, fenchol or 1,8-cineol, have both a collecting and a frothing effect. Other suitable frothers are non-ionic compounds, like, for example, polypropylene glycol ethers.

Depressants which may be effectively used for the purpose of the present invention include, for example, naturally occurring polysaccharides, such as guar, starch and cellulose. Quebracho, tannin, dextrin (white dextrin, British gum, and yellow dextrin) and other chemical derivatives may also be used, including in particular the derivatives of starch, guar and cellulose molecules of which the hydroxyl groups may be equipped with a broad range of anionic, cationic and non-ionic functions. Typical anionic derivatives are epoxypropyl trimethylammonium salts while methyl, hydroxyethyl and hydroxypropyl derivatives are mainly used as non-ionic compounds.

Solvents

To adjust their rheological behaviour, the flotation aids according to the present invention may contain solvents in a quantity of 0.1 to 40% b.w., preferably in a quantity of 1 to 30% b.w., and most preferably in a quantity of 2 to 15% b.w. Suitable solvents are, for example, the aliphatic alcohols mentioned above and other alcohols with shorter chain lengths. Thus the flotation aids according to the present invention may contain small quantities of glycols, for example, ethylene glycol, propylene glycol or butylene glycol, and also monohydric linear or branched alcohols, for example, ethanol, n-propanol or isopropanol.

As outlined above, flotation is carried out under the same conditions as state-of-the-art processes. Reference in this regard is made to the following literature references on the background to ore preparation technology: H. Schubert, Aufbereitung fester mineralischer Stoffe (Dressing of Solid Mineral Raw Materials), Leipzig 1967; B. Wills, Mineral Processing Technology Plant Design, New York, 1978; D. B. Purchas (ed.), Solid/Liquid Separation Equipment Scale-up, Croydon 1977; E. S. Perry, C. J. van Oss, E. Grushka (ed.), Separation and Purification Methods, New York, 1973 to 1978. As far as the process for conducting the froth flotation of non-sulfidic minerals and ores is concerned, their contents are incorporated by reference.

INDUSTRIAL APPLICATION

Another object of the present invention is the use of polymeric esterquats as collectors for the froth flotation of non-sulfidic minerals or ores. The collectors to be used in accordance with the invention may be used with advantage in the dressing of such minerals or ores as quartz, kaolin, mica, phlogopite, feldspar, silicates and iron ores.

EXAMPLES

Manufacturing Example M1

567 g (2.1 moles) of partly hydrogenated palm oil fatty acid, 219 g (1.5 moles) of adipic acid and 0.3 g of hypophosphonic acid were introduced into a stirred reactor and heated to 70° C. under a reduced pressure of 20 mbar. 447 g (3 moles) of triethanolamine were then added dropwise in portions and, at the same time, the temperature was increased to 120° C. After the addition, the reaction mixture was heated to 160° C., the pressure was reduced to 3 mbar and the mixture was stirred under those conditions for 2.5 h until the acid value had fallen to below 5 mg KOH/g. The mixture was then cooled to 60° C., the vacuum was broken by introduction of nitrogen, and 0.6 g of hydrogen peroxide was added in the form of a 30% by weight aqueous solution. For the quaternisation step, the resulting ester was dissolved in 376 g of isopropyl alcohol, and 357 g (2.83 moles) of dimethyl sulfate were added to the resulting solution over a period of 1 hour at such a rate that the temperature did not rise above 65° C. After the addition, the mixture was stirred for another 2.5 h, the total nitrogen content being regularly checked by sampling. The reaction was terminated when constant total nitrogen content had been reached. A product with a solids content of 80% b.w. was obtained.

Application Examples

The following examples demonstrate the superiority of the polymeric esterquats to be used in accordance with the invention over collector components known from the prior art, in particular compared to conventional mono/di-esterquat mixtures. The tests were carried out under laboratory conditions, in some cases with increased collector concentrations considerably higher than necessary in practice. Accordingly, the potential applications and in-use conditions are not limited to separation exercises and test conditions described in the examples. The quantities indicated for reagents are all based on active substance.

Examples 1-3

Comparative Examples C1-C3

The following examples and comparative examples illustrate the effectiveness of the collectors according to the present invention compared to conventional mono/di-esterquat collectors in the flotation of silicate containing calcite minerals. The results are shown in Table 1.

Particle size distribution: >40 μm: >50% b.w.

Silicates: about 1.5 to 2.5% b.w.

Calcite: about 97.5 to 98.5% b.w.

TABLE 1

Calcite flotation

| Composition | C1 | C2 | C3 | 1 | 2 | 3 |
|---|---|---|---|---|---|---|
| Dehyquart ® AU 46[1] [g * $t^{-1}$] | 660 | 560 | 320 | — | — | — |
| Dehyquart ® 04[2] [g * $t^{-1}$] | — | — | — | 350 | 300 | 250 |
| OMC 6317[3] [g * $t^{-1}$] | 100 | 100 | 85 | — | — | — |
| Results | | | | | | |
| Yield Floated Material [g] | 39.8 | 75.4 | 59.7 | 40.3 | 80.3 | 64.8 |
| Yield Residue [g] | 383 | 361 | 438 | 401 | 438 | 525 |
| Feed: HCl insoluble [%] | 2.6 | 2.6 | 2.2 | 2.5 | 2.6 | 2.1 |
| Floated Material: HCl insoluble [%] | 25.7 | 13.6 | 18.4 | 45.7 | 49.0 | 50.7 |
| Residue: HCl insoluble [%] | 0.09 | 0.18 | 0.57 | 0.06 | 0.1 | 0.35 |
| Calcite Loss [%] | 7.2 | 15.3 | 10.0 | 2.9 | 2.6 | 1.7 |

Examples 4-5

Comparative Examples C4-C5

The following examples and comparative examples illustrate the effectiveness of the collectors according to the present invention compared to conventional mono/di-esterquat collectors under conditions of high magnesium concentrations. The foam height was measured according to the well known Ross-Miles method. The results are shown in Table 2:

TABLE 2

Foaming behaviour in the presence of magnesium chloride (AS = Active Substance)

| Ex. | Product | Addition AS [% b.w.] | Quantity Product [g] | Test Solution | Foam height [ml] | Foam half life [min] |
|---|---|---|---|---|---|---|
| C4 | Dehyquart ® AU 46 | 1 | 2.25 | 2% $MgCl_2$ | 220 | 2:35 |
| | | | 2.29 | 2% $MgCl_2$ | 220 | 2:35 |
| C5 | Dehyquart ® AU 46 | 1 | 2.27 | 5% $MgCl_2$ | 220 | 0:30 |
| | | | 2.34 | 5% $MgCl_2$ | 220 | 0:30 |
| 4 | Dehyquart ® AU 04 | 1 | 2.25 | 2% $MgCl_2$ | 220 | 2:05 |
| | | | 2.29 | 2% $MgCl_2$ | 220 | 2:05 |
| 5 | Dehyquart ® AU 04 | 1 | 2.27 | 5% $MgCl_2$ | 220 | 0:15 |
| | | | 2.54 | 5% $MgCl_2$ | 220 | 0:15 |

[1]Methyl-quaternised Triethanolamine-mono/di-stearate, Methosulfate, 90% b.w. AS (Cognis Iberia, ES)
[2]Polymeric esterquat, 90% b.w. AS (Cognis Iberia, ES) according to Manufacturing Example M1
[3]Frother (Cognis Deutschland GmbH & Co. KG, DE)

As one can see, the collectors according to the present invention lead to a faster collapse of the foam compared to the state of the art which is desirable in the flotation of minerals and ores.

What is claimed is:

1. A process for the [flotation] *separation* of non-sulfidic minerals or ore *from unwanted constituents of crude mineral or ore, the process* comprising:

(a) mixing *the* crushed crude minerals or ores with water and a collector to form a suspension, and (b) introducing air into said suspension in the presence of a reagent system to form a floated foam [containing said non-sulfidic minerals or ores along with a flotation residue comprising the gangue], wherein said collector comprises polymeric esterquats, which are obtained by reacting alkanolamines with a mixture of monocarboxylic acids and dicarboxylic acids in a molar ratio of 1:10 to 10:1, and quaternising the resulting esters, optionally after alkoxylation.

2. The process of claim 1, wherein said polymeric esterquats are derived from said alkanolamines represented by formula (I),

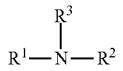

(I)

in which $R^1$ represents a hydroxyethyl group, and $R^2$ and $R^3$ independently represent hydrogen, methyl or hydroxyethyl.

3. The process of claim 1, wherein said alkanolamine comprises triethanolamine.

4. The process of claim 1, wherein said polymeric esterquats are derived from mixtures of (i) Monocarboxylic acids according to general formula (II), $$R^4CO—OH \quad (II)$$

in which [[X]] $R^4CO$ represents a linear or branched acyl moiety having 6 to 22 carbon atoms and 0 or 1 to 3 double bonds, and (ii) Dicarboxylic acids according to general formula (III), $$HOOC—[X]—COOH \quad (III)$$

in which [X] represents an optionally hydroxysubstituted alk(en)ylene group having 1 to 10 carbon atoms.

5. The method of claim 1, wherein the alkanolamines and mixture of monocarboxylic and dicarboxylic acids are present in a ratio of 1 to 1.2.

6. The process of claim 1, [characterised in that] wherein said polymeric esterquats are based on mixtures of C12-C22 fatty acids and adipic acid.

7. The process of claim 1, further comprising [quatenised] *quaternised* N,N-dialkylaminoalkylamides as co-collectors.

8. The process of claim 7, wherein said collectors and said co-collectors are used in a weight ratio of 10:90 to 90:10.

9. A method of froth flotation of non-sulfidic minerals or ores comprising adding the polymeric esterquats, which are obtained by reacting alkanolamines with a mixture of monocarboxylic acids and dicarboxylic acids in a molar ratio of 1:10 to 10:1, and quaternising the resulting esters, optionally after alkoxylation, as collectors.

10. The method of claim 9, wherein calcite minerals are subjected to said froth flotation.

11. The method of claim 1, wherein the alkanolamines and mixture of monocarboxylic and dicarboxylic acids are present in a ratio of 1:1.3 to about 1:2.4.

12. The method of claim 11, wherein the ratio is 1:1.4 to 1:1.8.

13. The method of claim 1, further comprising alkoxylation prior to quaternization.

14. The method of claim 9, further comprising alkoxylation prior to quaternization.

15. The method of claim 9, wherein the alkanolamines and mixture of monocarboxylic and dicarboxylic acids are present in a ratio of 1 to 1.2.

16. The method of claim 6, wherein the monocarboxylic acid comprises oleic acid.

17. The method of claim 9, wherein the monocarboxylic acid comprises oleic acid and the dicarboxylic acid comprises adipic acid.

*18. A method of separating non-sulfidic minerals or ores from gangue comprising adding polymeric esterquats, which are obtained by reacting alkanolamines with a mixture of monocarboxylic acids and dicarboxylic acids in a molar ratio of 1:10 to 10:1, and quaternising the resulting esters, optionally after alkoxylation, as collectors.*

* * * * *